United States Patent
Barnes

[19]

[11] Patent Number: 5,929,844
[45] Date of Patent: Jul. 27, 1999

[54] FIRST PERSON PERSPECTIVE CONTROL SYSTEM

[75] Inventor: James C. Barnes, Pleasanton, Calif.

[73] Assignee: First Person Gaming, Inc., Pleasanton, Calif.

[21] Appl. No.: 08/642,778

[22] Filed: May 3, 1996

[51] Int. Cl.⁶ .................................................. G09G 5/00
[52] U.S. Cl. .......................................... 345/156; 463/37
[58] Field of Search .................................... 345/156, 157, 345/160, 161, 162, 163, 166, 167; 463/32, 36, 37, 38

[56] References Cited

U.S. PATENT DOCUMENTS

| | | | |
|---|---|---|---|
| 4,850,591 | 7/1989 | Takezawa et al. | 463/38 |
| 5,421,590 | 6/1995 | Robbins | 345/162 |
| 5,704,837 | 1/1998 | Iwasaki et al. | 463/38 |
| 5,724,558 | 3/1998 | Svancarek et al. | 345/158 |

*Primary Examiner*—Dennis-Doon Chow
*Attorney, Agent, or Firm*—Raymond E. Roberts; Michael J. Hughes

[57] ABSTRACT

A controller (10) for two handed user input of linear and orientation data to control graphical images on a computer (12), and thus to permit the user to interact with application software running on the computer (12) in first person perspective. The controller (10) includes a first control sub-unit (14), for inputting data for two axes, and a second control sub-unit (16), for inputting two additional axes of data. Control-ware (18) is further included which combines the data from the first and second control sub-units (14, 16) into an integrated data set which is communicated to the computer (12). The control-ware (18) is capable of optional pre-processing tasks on the contents of the data set before communicating it to the application running on the computer (12). One example of such an optional pre-processing task is auto-leveling (100), whereby under desirable conditions the users first person perspective view in the graphical images is automatically urged toward level in an overrideable manner.

26 Claims, 4 Drawing Sheets

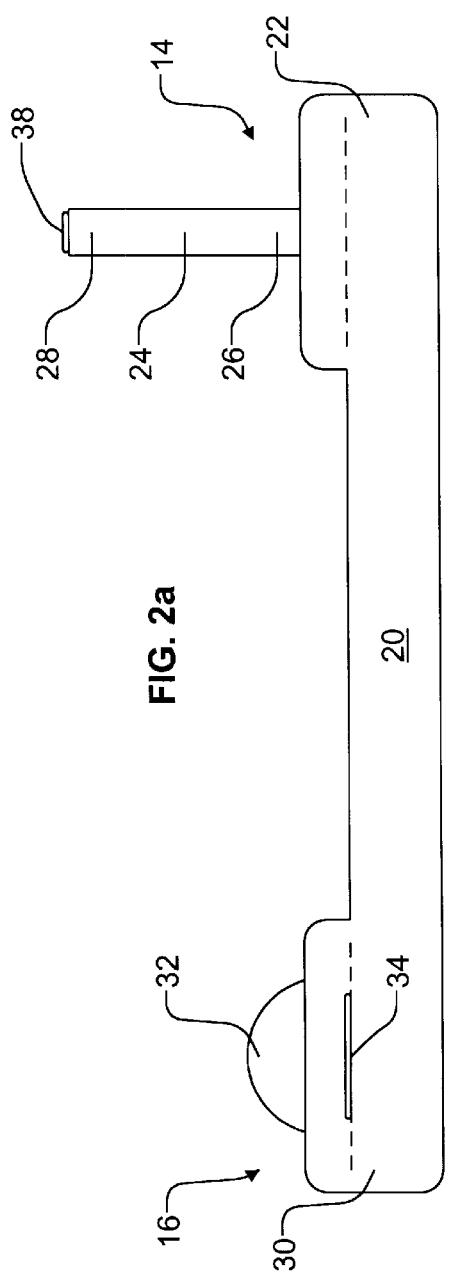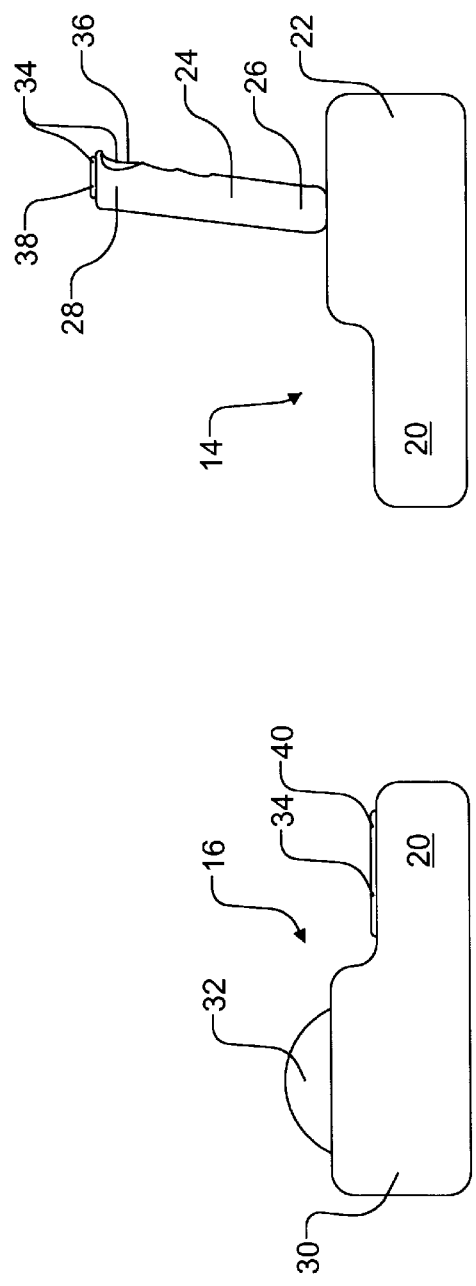
FIG. 2a
FIG. 2b
FIG. 2c

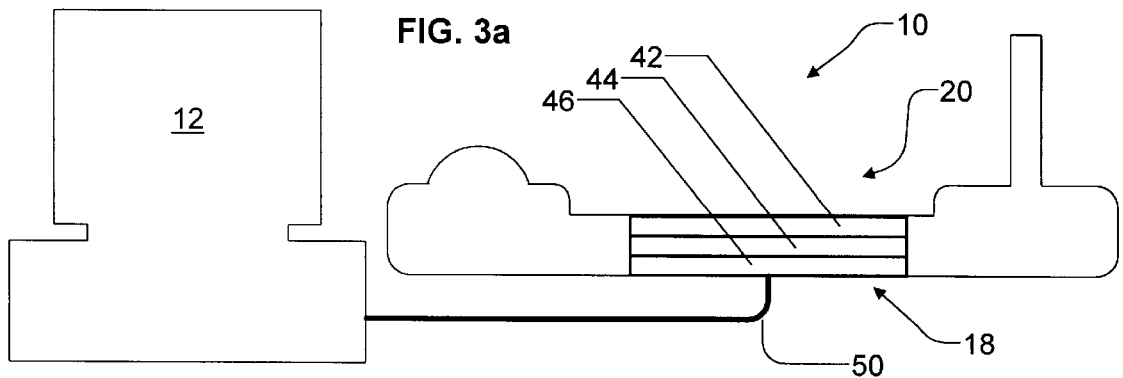
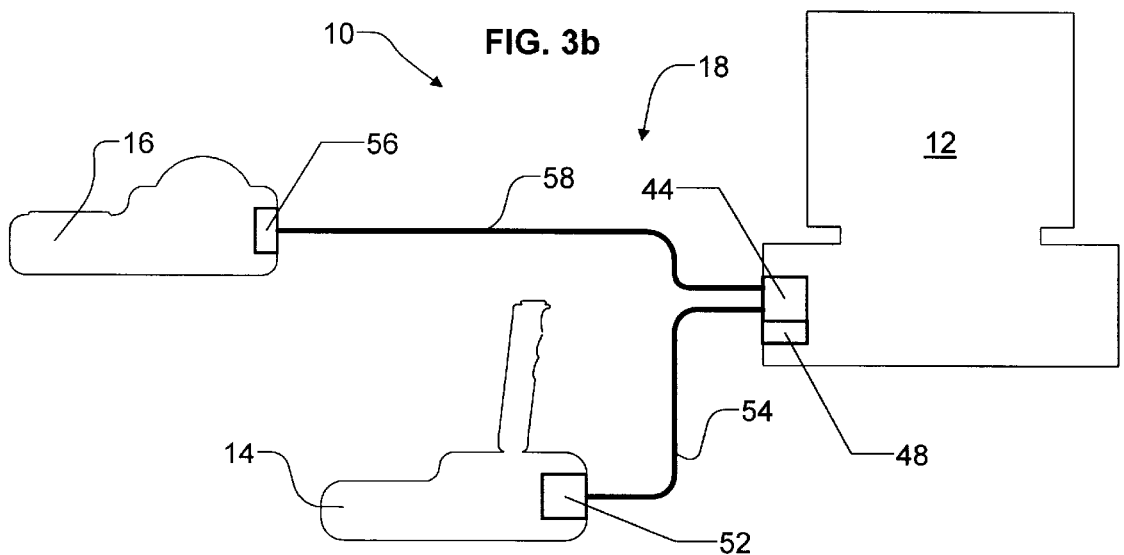
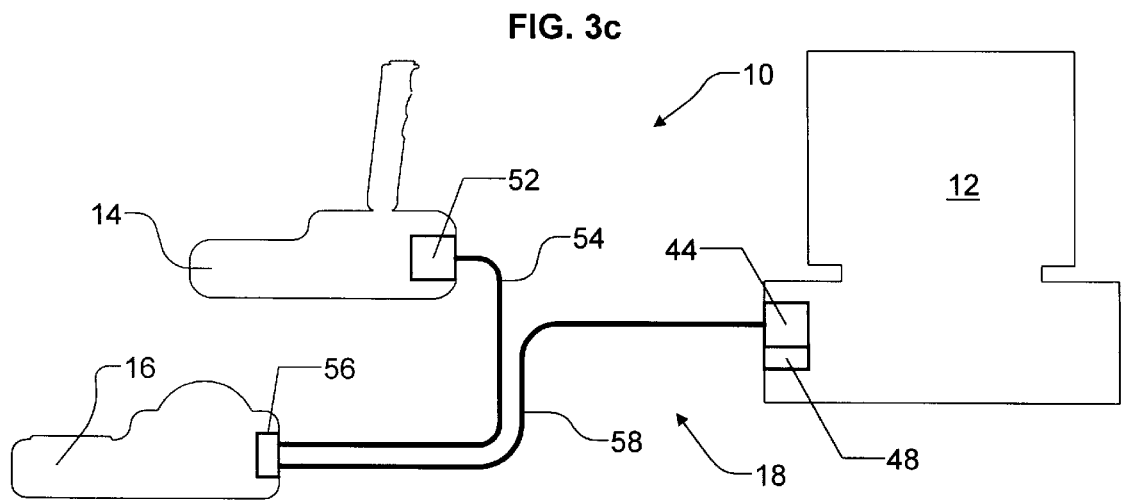

FIRST PERSON PERSPECTIVE CONTROL SYSTEM

TECHNICAL FIELD

The present invention relates generally to hand operation of control systems, and more particularly to first person real time interaction with and control over computer generated graphical images. The inventor anticipates that primary application of the present invention will be in control of simulations, particularly including interactive computer games running on personal computers.

BACKGROUND ART

Various means of human interaction with computers exist today, but few are entirely suitable for interaction in the first person perspective with computer generated graphical environments. Increasingly, users wish to "travel" within computer generated simulations. (For discussion, games will be considered a subclass of simulations in general here.) While large scale simulators which enclose all or part of an operator's body have existed for some time, they are quite expensive and otherwise impractical for the average user today. In contrast, powerfull personal computers are affordable and are practical, taking up relatively little room and using little electrical power. Such current generation personal computers are capable of running relatively powerful simulations, and a rapidly growing amount of simulation software already exists for them. Perhaps most common are game type simulations, where one or more users interact with an entire simulated environment in tests of mental and dexterous skills. Unfortunately, while computer processing hardware has become quite inexpensive, and while software development capability has become quite powerfull, corresponding change has not occurred for user input/output ("I/O") equipment. This has become a serious bottle-neck for operation of existing generation simulations, as well as for the development of the next generation of simulations.

Prior Art Hardware

Keyboards are one of the oldest, and today remain the most widely used computer input device. Keyboards have a plethora of keys, typically 102, and operate by user pressure to create digital state changes which a computer interprets to represent characters of text.

Unfortunately, for inputting anything other than text, keyboards are very awkward to use. Further, they are generally regarded as incapable of analog type input. (Today little discrete computer equipment uses true analog signals. Instead, high speed digital signals are used to simulate analog. In further discussion herein the term "analog" will generally be used to mean analog appearing, regardless of how achieved or the actual nature of the signals involved.) To smoothly interact with computer graphical environments, analog type input is often preferred or necessary. For these and other reasons, computer users wishing to communicate in real time with computer generated environments overwhelmingly abandon keyboards for other input devices.

The second most widely used input device today is the mouse. Mice provide analog type inputs representing movement in two bounded linear axes (or what some term two degrees of freedom), as well as buttons for providing digital state change inputs. Mice have a number of advantages. They require little training to operate, unlike typing at a keyboard, and users do not need to visually observe the mouse when using it, unlike hunt-and-peck typing. Further, to a limited extent, mice can be used to enter complex variants of linear movement, like velocity and acceleration.

Unfortunately, mice also have disadvantages. The movement range of a mouse is "bounded." It is absolutely bounded by the users reach and often also so by surface dimensions where it is operated (e.g., it can not be moved beyond the boundaries of a mouse pad or the available desktop surface). Further, mice are generally not suitable for inputting orientation data (e.g., pitch, roll, and yaw, or complex variants of these data types).

Somewhat related to mice are trackballs, which are often simplistically portrayed as mice turned upside-down. A key advantage of trackballs is that in addition to linear movement information, they may be used to input orientation and its complex variants. Unlike mice, and joysticks which are discussed below, trackball movement range is not bounded either linearly or orientationally. A trackball can move an infinite "length" or be rotated any possible number of degrees. Unfortunately, trackballs have problems with crosstalk and sometimes produce unnatural movement scenarios (problems discussed more below).

The last of the common individual input devices considered here is the joystick (many other types of input devices exist for specific purposes, but those discussed here are by far the more popular). Stick and rudder controls have existed long before computers. Therefore it was only natural that as computers were used to simulate stick controlled applications a similar input device would be developed. Joysticks have a hand operated lever which can be tilted through two axes (i.e., two degrees of freedom). Almost all joysticks also have additional input devices incorporated into the lever handle, examples of which include digital state changers such as trigger buttons and analog inputs such as thumb pressure pads.

Joysticks require little user training, and unlike all of the previously discussed input devices, they have an inherent center or origin. Further, special features can be built directly into a joystick or provided via software drivers to pre-format the joystick signal content. Examples include degrees of non-linear input scaling and dead-zones where movement produces no input (often implemented as a leaving center dead-zone only; i.e., subsequent handle movements crossing over the zero position do not encounter a "dead" region).

However, even joysticks have limitations, perhaps the most important being that they are orientation bounded. For example, the stick handle portion of a joystick can typically only pivot through a 60 degree conical region.

Still other user input devices are possible (e.g., knobs), but are very little used today, particularly for input to personal computers. Combinations of devices are of course also possible, and in fact almost all PC's today are at some point provided with keyboard and mouse, or keyboard and trackball combinations. When desired, joysticks are usually added to such combinations as an aftermarket accessory. Joysticks are particularly popular with players of computer game simulations, with many such games being inoperable without a joystick for input.

Particular combinations of devices as well as combination devices also deserve note here. Users of computers can only operate one or two input devices concurrently, because they only have two hands, but combination device usage to some extent is possible. Personal computer systems can have both a joystick and a trackball, but due to computer data port constraints, most can only have one such device active at a time. Somewhat of an exception to this is the device called a game pad. Game pads are relatively small lightweight input units designed for the user to pick up and operate in a two-handed manner, using their thumbs for primary data input, but also often having optional input devices like triggers. A typical game pad will have a miniature track ball for operation with one thumb, and a miniature joystick or force sensitive pressure pad for operation with the other thumb. However, the inventor knows of no game pads that "add value" to the basic input device signals from the devices incorporated into a game pad. Finally, an interesting integrated device about to enter the market is a combination joystick-knob unit (the knob is a spinner type device, having no detents or stops). This is a Logitech Corporation product named the WingMan Warrior, which uses the knob to provide yaw control, i.e., a single orientation degree of freedom.

First Person Perspective in Graphical Environments

Simplistically put, users of computer simulations want to do two things. They want to geographically move within simulations and they want to look about within simulations (e.g., within three linear and three orintational dimensions). A third desirable activity within simulations is manipulation, use of the hands within the simulation itself; but that is a complex topic which is not particularly germane here. Unfortunately, in the market today, input devices for personal computers either do not provide ability to accomplish both of these goals with any appreciable independence, or when they do provide independent view control they provide it too independently (i.e., in a manner unlike normal human vision).

Movement is usually the dominant goal in computer simulations. Much like in real environments, users of simulated virtual environments want to advance, retreat, veer to one side or another, and change speed. Since most of these operations are ones where a user needs to look in the direction of movement, or opposite to that direction if movement is backwards, most simulations have simplistically omitted any independent control over where the user looks. The exceptions to this have provided very limited vision control (e.g., field of view control, still centered on the movement axis); or have achieved only awkward viewing, usually by requiring a switch between move and observe modes; or have provided unrealistic viewing. A common example of unrealistic viewing is "running around looking at the ceiling," which can result from the awkwardness of changing the view direction or having to actively maintain the view characteristics when also devoting attention to complex or rapid movement control (i.e., the inventor perceives this as a case of too much independence in the view controls, for reasons discussed below). In such cases, users can end up disoriented within the simulation and can even become physically nauseous and disoriented in the real world, due to their concentration on the simulation.

A key observation of the inventor is that the above noted requirement to positively and continuously control view is contrary to the way humans usually visually interact with the real world. In day to day human experience, most human vision is automatic, but with the automatic aspects intentionally overrideable. For example, scanning one's view slightly left and right, and slightly up and down are automatic visual activities when driving and walking. In contrast, looking over one's shoulder before changing highway lanes and walking down a corridor and looking left into an open office doorway are common deliberate actions. Notably, in most simulations the above automatic visual actions require deliberate effort and even the above simple deliberate actions are impossible or impractical, due to input system limitations.

Another inconsistency between human interaction with the real world and with simulated virtual environments is hand usage. Humans can, and of course a considerable portion of the time automatically do, perform different tasks with their two hands. Thus, entirely ignoring manipulations (and usage inside the simulation itself), users have two hands which may be used separately for inputting data to perform control functions. Notably, aside from two-handed control of single devices (e.g., keyboards, game pads, and the rare exception like Logitech's WingMan Warrior), two hand control of simulations is today under exploited.

Study, experimentation, and reflection on the above have led the inventor to two novel sets of observations. First, provided the right input system, in scenarios where it is suitable to tie observation to movement, humans can use one hand to control linear movement (e.g., direction and speed) while concurrently using their other hand to control aspects of orientation (e.g., yaw and pitch, or pitch and roll). For reference here, this will be called type one control: extension of user movement capabilities within simulations. Second, again with a suitable input system, humans can use one hand to control movement and concurrently use their other hand to control their view as they move in first person through simulations. This will be termed type two control: addition of user view control to existing movement capabilities within simulations, something which has been awkward or simply not possible in simulations to date. (For purposes of discussion herein, directions of view will be in terms of view pitch and view yaw. The rationale for these designations is that humans typically adjust the non-horizontal component of their view direction by adjusting the pitch of their head or eyes. Similarly, humans adjust the non-vertical component of their view direction by adjusting the yaw of their head or eyes. In contrast, roll type movement is little used for directing human view. Of course, other systems to designate the coordinates needed to describe a direction of view are possible. However, the inventor finds the above form particularly useful in consideration of the dual possible types of control here.)

Type one control is seemingly easily accomplished, after all, joysticks and trackballs have existed for some time and it requires no great imagination to try using one of each concurrently. Unfortunately, for a number of reasons, this simplistic approach has not worked very well.

First, this raises host computer hardware concerns. To use two discrete devices simultaneously necessarily requires having two physical computer ports for their attachment (e.g., serial ports, game ports, or parallel ports). Typically, personal computers do come with multiple ports, but with some already allocated to input devices like mice, printers, modems. Thus, if even possible in a "fully" loaded computer, another input port may have to be added to the host computer. Further, inside the computer, input device address and interrupt conflicts are possible (and are considered by many service personnel, and users who have tried to upgrade their own computers, to be the bane of the personal computer industry). In sum, input systems which require modifying the host computer itself are not generally acceptable in the marketplace.

Second, such an approach unduly burdens simulation creators. Simulations using multiple discreet devices have to accommodate the data and control protocols of the plethora of available devices, as well as of possible future devices. Further, they have to do this by working with the electronic protocols of the computer port hardware available, which may be serial, parallel, game port, custom, or even combinations of these if multiple ports are used. This is a daunting task, which even if it were completely possible, is not at all desirable to simulation creators. From a software (e.g., simulation program) producer's perspective, the preferable approach is to let the producers of hardware (e.g., input devices) handle communications between their devices and the host computer hardware. The preferred means to this end are software drivers. With software drivers the input devices can interface with simulations in a generic manner (e.g., via I/O interrupt, DMA channel, and processor port addressing for data transfer) and giving them data in very generic format (e.g., linear and angular directions, distance, velocity, and acceleration all in standard units). It follows that type one control is preferably accomplished with an integrated approach by the input device maker providing a software driver and only a single available conventional port (e.g., a game port), rather than by merely aggregating existing off-the-shelf input devices. Further, by having the input device maker provide a device driver other benefits are possible. For example, value added features to best exploit the particular input device hardware can be incorporated into the software driver.

All of the above mentioned control systems and the prior art hardware used therein have, however, not satisfied user demand for efficient and comprehensive human first person interaction with computer generated graphical environments. For interacting by moving about, directing one's view, and in some cases performing manipulations within the three-dimensional virtual worlds created by computer simulations users have a present and growing need for improved input control systems and the input equipment upon which such systems can function.

DISCLOSURE OF INVENTION

Accordingly, it is an object of the present invention to provide an improved input system for controlling graphical simulated environments in the first person perspective.

Another object of the invention is to provide an input system for two handed control of such graphical simulated environments.

Another object of the invention is to provide an input system for concurrently controlling movement, both linear and angular, in multiple axes through simulated environments.

Another object of the invention is to provide an input system for concurrently and independently controlling the directions of view and of movement through simulated environments.

And, another object of the invention is to provide an improved quality of user viewing when concurrently moving in a simulated environment.

Briefly, one preferred embodiment of the present invention is a system for controlling in the first person perspective the graphical images produced by a computer simulation. The system uses two manual input units, one for each of a user's two hands. These manual input units may be physically discrete or may be integrated into one housing, but each such unit is capable of inputting at least two axes of either linear or orientational data to the simulation. In this manner a user may input four axes, as well as additional optional inputs, which may be used to control movement or a user's view within a simulation. A control capability is further provided, which integrates data from the manual input units into a unified data set which is communicated to the simulation creating the graphical images. Finally, this control capability may optionally perform a variety of pre-processing tasks upon the data before it is presented as the data set to the simulation. Such optional pre-processing tasks include, but are not limited to, providing a dead-zone, non-linear scaling, automatic movement control, automatic view pointing, and timestamping of data to permit calculation of motion derivatives which are more accurate.

An advantage of the present invention is that it provides additional control over graphical simulated environments. Users may employ both of their hands to create input data, thus effectively doubling the possible interactive control they have over a simulation. Further, by using the invention to split total control between two hands it is possible to provide two different inherent types of input characteristics. For example, one hand may be used for bounded inputs while the other is used for unbounded inputs; or, one hand may be used to direct generally planar movement while the other is used to direct either orientation or direction of view.

Another advantage of the invention is that, while permitting an increased number of inputs, the invention does so in a manner which adds little if any burden to the user. For example, existing input devices typically have two major axis inputs, but are often also "crowded" with extra inputs such as digital state change inputs (e.g., triggers or buttons) or analog inputs (e.g., pressure pads). In contrast, the present invention permits control of four major axes of input, as well as such extra inputs, if desired. However, due to the ability of the invention to control twice as many major inputs, such extra inputs may either be omitted or may be allocated to other, perhaps less frequently used, functions entirely.

Another advantage of the invention is that it may incorporate a large degree of automatic, but user overrideable, control of view characteristics, thus strongly mimicking natural human visual control. This can relieve the user of the burden of constantly controlling view. Further, the assumed automatic characteristics may be easily and selectively overridden, either by the user or by the application simulation.

Another advantage of the invention is that it permits more ergonomic hand usage. By using two hands to control simulations the work is allocated between both hands. Therefore, neither hand need be used as rapidly or in as concentrated a manner as would a hand on a single handed input device. Still further, advantage is gained in this respect due to the balancing of input related stresses across the respective hands, arms, and the upper torso of the user's body. This is particularly noticeable in control of active real time simulations like games, where users often become so engrossed and burdened with stress in their interaction with the simulation that they develop muscular soreness.

And, another advantage of the invention is that it may be implemented with optional data pre-processing and overrideable automatic movement and viewing control features which permit more ergonomic overall interaction with simulations. Real world as well as infra-simulation disorientation in users who become engrossed in their activity can be reduced or eliminated by the invention's ability to provide more realistic movement and viewing scenarios. Although not readily appreciated by those who are not users of interactive simulations (e.g., intense action gaming simulations), this is particularly notable because disorientation produced by some input systems can become so extreme that physical nausea results.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIG. 2a is a front plan view illustrating major structural details of an integrated embodiment of the invention, while FIG. 2b is a left side plan and FIG. 2c is a right side plan view of this same embodiment;

FIG. 3a is a stylized integrated embodiment of the invention depicted with shadow outlines of the major physical elements, and block and line representations of the control and communications elements, FIG. 3b and FIG. 3c, using similar depiction, portray two different non-integrated embodiments;

BEST MODE FOR CARRYING OUT THE INVENTION

Figure 1:
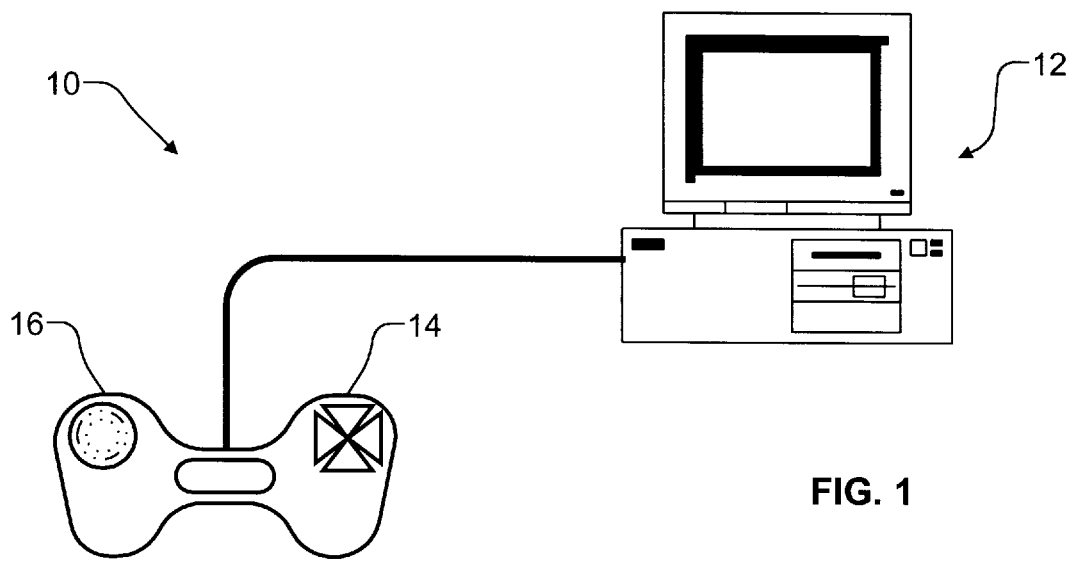
FIG. 1 is a stylized depiction of the major physical parts of an integrated embodiment of the invention, and a personal computer utilizing it.

A preferred embodiment of the present invention is a controller for two handed first person interaction with a simulated graphical environment. As illustrated in the various drawings herein, and particularly in the view of FIG. 1, a form of this preferred embodiment of the inventive device is depicted by the general reference character 10.

FIG. 1 illustrates the controller 10 in the context of a typical personal computer ("PC") system 12 (hereinafter PC 12). The major component parts of the inventive controller 10 are: a first control sub-unit 14, a second control sub-unit 16, and control-ware 18 (not shown in FIG. 1). The particular embodiment shown in FIG. 1 is intended for hand held use by a user (i.e., it is what many computer gaming players term a "game pad"). Because terms like "control sub-unit" too easily permit confusion and soon become odious in repeated usage, for purposes of description in the discussion below the first control sub-unit 14 will generally be referred to as the mover 14 and similarly the second control sub-unit 16 will generally be referred to as the orienter 16 (for traditional true positional orienting or alternately for "orienting" the direction of view). However, these alternate namings are not to be interpreted restrictively, the reader should appreciate that the spirit of the present invention is not limited by the number of examples or the nature of the few examples presented herein.

FIG. 2a (front), 2b (left side), and 2c (right side) illustrate more specific details of the mover 14 and the orienter 16 in an embodiment where these two components are combined into an optional integrated unit 20 which is the entirety grasped or touched by a user (a "base unit" configuration in the vernacular of many PC game simulation users). Whether the integrated unit 20 is provided will largely be driven by market preferences. The inventor has observed that users are inclined to more robustly physically interact with larger input systems. However, use of the integrated unit 20 may unduly fix the left-right relationship of the mover 14 and orienter 16, which could be undesirable, say for left-handed users. To address this concern the controller 10 can be marketed in two versions, or can even be made physically user configurable.

As can readily be appreciated from FIG. 2a–2c, the mover 14 resembles a conventional joystick and the orienter 16 resembles a conventional trackball. This is intentional in this preferred embodiment, but not a necessary requirement (e.g., one or both could be replaced with a force sensative resistor pad, as is depicted for the mover 14 in FIG. 1). Joysticks have already gained wide acceptance for simulation control, being able to input bounded linear data and variants of it (e.g., velocity and acceleration). Further, a joystick is well complemented by a trackball, which is capable of inputting multi-axis unbounded angular data and complex variants of it.

The mover 14 includes a base portion 22 and a handle 24 which is suitably shaped for grasp by the human hand, and which enters the base portion 22 in a manner permitting pivotal movement. For purposes of discussion, the handle 24 has defined therein a lower end 26, which enters the base portion 22, and an opposite top end 28. Similarly, the orienter 16 includes a base portion 30 and a ball 32, which is suitable for rotation by human fingers.

Various optional controls 34 may be incorporated into the controller 10, much like conventional devices such as mice, trackballs, and joysticks have optional control features added. Examples of such optional controls 34 are shown in the embodiments of the mover 14 and the orienter 16 used in the integrated unit 20 portion of the controller 10 presented in FIG. 2a–2c. Near the top end 28 of the handle 24 a trigger 36 is provided, and in the top end 28 of the handle 24 a thumb pressure pad 38 is provided. Similarly, the orienter 16 in FIG. 2a–2b presents an example of a butt plate 40, for a user to "butt" or press with the heel portion of the hand's palm to input a digital state change.

The uses for such optional controls 34 vary, and can even be quite dynamic, to suit the whims and creativity of simulation designers. For example, a first simulation application run on the PC 12 may use such optional controls 34 to further control movement or orientation within the simulation, while another later simulation run on the same PC 12 may use the optional controls 34 to perform manipulations or direct the user's view within the simulation. Huge variety in choice of optional controls 34 is possible from among existing conventional control types, and specialized control types may be developed for such use as well. However, selection of optional controls 34 is a mere exercise in engineering, and is therefore not highly germane to the spirit of the present invention.

For the most part, this discussion will not belabor structural, mechanical, and electronic circuitry details of the various hardware which may be used to implement the mover 14 and the orienter 16. Once the spirit of the present invention is grasped, the roles of these components may be easily filled by those skilled in the relevant arts. These components may be custom assembled, or more simply selected from among existing joysticks, trackballs, and other device types all widely currently available in the market (e.g., the embodiment in FIG. 2a–2c might be largely constructed by combining existing joystick and trackball assemblies, perhaps having their housings removed, and placing them inside the housing forming integrated unit 20). Obviously, if the present invention were only these two components it would be a mere aggregation. It is therefore emphasized that practice of the present invention requires combination of the mover 14, the orienter 16, and the control-ware 18.

FIG. 3a, 3b, and 3c depict three of the many possible physical implementations of the controller 10, in a manner emphasizing the control-ware 18 (a term preferred here because words like software, hardware and firmware have overly restrictive and stereotypical connotations; e.g., control-ware 18 may be implemented in any one of these, or in any combinations of these). FIG. 3a portrays a "base unit" physical implementation of the controller 10, such as that depicted in FIG. 2a–2c. In this integrated controller 10, both the mover 14 and the orienter 16 are housed together in the integrated unit 20, as are a number of components of the control-ware 18. The control-ware 18 includes an initial formatter 42, a processor 44, and a final formatter 46.

An optional feature which may be incorporated into the control-ware 18 which is not conventional in the present art, but which is common in other electronics arts, is timestamping of signal data. While timestamping can not be performed with existing "off the shelf" joystick and trackball hardware, it is a rather easy extension of such using conventional electronics principles, once its desirability is appreciated. Timestamping of data from either the mover 14, the orienter 16, or both can be effected in any of the formatter 42, the processor 44, or the formatter 46. The advantages of timestamping are discussed below.

FIG. 3a further shows a transmitter 50, which is provided to convey data from the integrated unit 20 to the PC 12. Of course, the control-ware 18 does not have to be located in the integrated unit 20. As will be described below, a daughter board containing some or all of the control-ware 18 can be placed in the PC 12. However, it should be noted that most users want to simply plug an input device into their computer, rather than bother with opening it up and installing a dedicated daughterboard, which may not even be possible in some cases.

FIG. 3b portrays one control-ware 18 implementation to work with a discrete mover 14 and a discrete orienter 16. This implementation includes a mover initial formatter 52, a mover transmitter 54, an orienter initial formatter 56, an orienter transmitter 58, as well as the processor 44 and the final formatter 48 (both the same as in FIG. 3a).

In this implementation, timestamping can be accomplished at two possible locations. First, at the control sub-units (14, 16), in the mover initial formatter 52 or the orienter initial formatter 56. Alternately, second, in the processor 44 or the final formatter 48, if these are on a daughter board with its own clock, since the whole point of timestamping is to permit the PC 12 to deal with controller 10 supplied data in an asynchronous manner. In modern computers, such as PC 12, many tasks are competing for main processor clock cycles. Buffers (e.g., many typical conventional serial ports today use a type 16550 UART, Universal Asynchronous Receiver/Transmitter, integrated circuit device which has a 16 byte internal buffer) are typically provided in PC communications hardware used for receiving signals, to hold received data until the PC main processor can deal with it (i.e., process an interrupt signal indicating that something has arrived, retrieve any data from a UART buffer, and then do something with it; e.g., apply a timestamp based on the system clock and store or do further immediate processing of the received data). Obviously, by the time a main processor does get to data it may be some appreciable time after that data actually arrived. Further, due to variations main processor duties, such delay will vary. Hence there is always a somewhat asynchronous aspect to actual receipt and processing of data in a PC (i.e., there is an inherent latency, and it is variable). Time dependent values, such as velocity and acceleration, which are calculated from latent data will be correct if the data latency is constant, but will be erroneous if the latency is variable, as in a PC handling multiple tasks. To users, such variable latency can cause a noticeable appearance of "jerkiness" and unpredictability in a control system used for inputting "real time" data. If a significant concern, which admittedly is not always the case, the inventor's solution is to timestamp data from the controller 10 in a manner insuring that latency will be constant. One way to do this is to derive the timestamp from a clock other than that of the PC 12 (e.g., an additional clock, located in the control sub-units (14, 16) or on a daughter board implementation of the processor 44 and formatter 48). Thus, by using the formula rate equal distance divided by time, and insuring that the time values used are accurate, more precise user control is provided.

FIG. 3c portrays yet another control-ware 18 implementation having a discrete mover 14 and a discrete orienter 16. This implementation is generally the same as that of FIG. 3b, except that the mover transmitter 54 connects to the orienter initial formatter 56. Such an implementation is advantageous because it permits timestamping of both mover 14 and orienter 16 data to be done in the orienter initial formatter 56, with a clock located there, thus eliminating the need for a separate clock bearing daughterboard in the PC 12 (as noted above when describing FIG. 3a, something which many users consider undesirable).

In all of FIG. 3a–3c, the initial formatters (42, 52, 56) are optional, being required only when data signals from the mover 14 or orienter 16 are not in desired format for use by the processor 44, or for use by the transmitters (50, 54, 58) when the processor 44 is not the next proximate component (see e.g., FIG. 3b). The signals accepted by the initial formatters (42, 52, 56) will typically be electronic in nature, but may also be of other forms (e.g., optical, or sonic).

The processor 44 is a key component part of the invention, combining data signals (originating at the mover 14 and orienter 16, but tailored as needed by the initial formatters (42, 52, 56)) into sets comprising the entire data collection which will ultimately be acted upon by the application simulation. It should accordingly be noted that the processor 44 is a necessary component in any implementation of the inventive controller 10. Conventional electronics (e.g., microprocessor and memory) may be used to implement the processor 44. Further, if not requiring a separate clock for timestamping purposes, the processor 44 may be entirely implemented as a software driver in the host PC 12 (e.g., as in FIG. 3b). Alternately, part of the processor 44 (e.g., a timestamp clock bearing portion) may be implemented as firmware and hardware outside of the PC 12, while a software driver running in the PC 12 is used to implement the rest of the processor 44. The inventor anticipates that this will be done in many cases.

The processor 44 may further perform desired pre-processing on the data before its use by the simulation program running on the PC 12. For example, providing a dead-zone which is variable in size or which can be disabled entirely is very difficult in the hardware of the mover 14, but is easily accomplished in the processor 44, by selectively passing data from the mover 14 into the set of data supplied to the simulation running on the PC 12. Huge variety in such pre-processing tasks can be envisioned, and one such particularly valuable capability will be examined here in detail. The inventor terms this feature auto-directing, and a form of it called auto-leveling 100 is examined below.

In the real world human sight is one of the more automatic of human functions. However, it is not entirely automatic like breathing or the beating of the heart. Further, due to body structure, humans predominantly move in forward directions and manipulate objects which are in front of them. It is therefore understandable that their vision is predominantly aimed forward, and directable downward at regions which their hands typically occupy. While humans cannot aim their eyes or pivot their heads 180 degrees to see directly behind, they can deliberately pivot their eyes and rotate their heads enough to see somewhat behind or to look straight up at something in the sky. These are examples of human abilities to override automatic view pointing.

Unfortunately, to date, efforts to copy such natural human viewing ability in simulations have worked poorly. As previously noted, many simulations give users no control at all over view direction, instead always providing a fixed view which is directed along the axis of present or possible forward motion. Further, even when prior art vision control systems have provided control independent of the motion controls, they have done so in a manner that is often awkward, either using leftover controls not used for motion (e.g., unused joystick triggers, after the joystick handle pivot inputs are used for movement control), or by requiring impractical scenarios in the midst of simulations (e.g., like switching between movement and view modes). Still further, even when past simulations and input systems have provided view control, the resultant viewing has often been unrealistic. For example, allowing complete rotation of viewing around an entire axis (i.e., all 360 degrees), because the input device is capable of such movement. Even more egregious, however, has been that such prior art viewing capability has usually required constant interactive control by the user, distracting users from controlling other simulation parameters, or even causing them to become disoriented both inside and outside of the simulation. (One example, "running around while looking at the ceiling" has already been discussed.)

Figure 4:
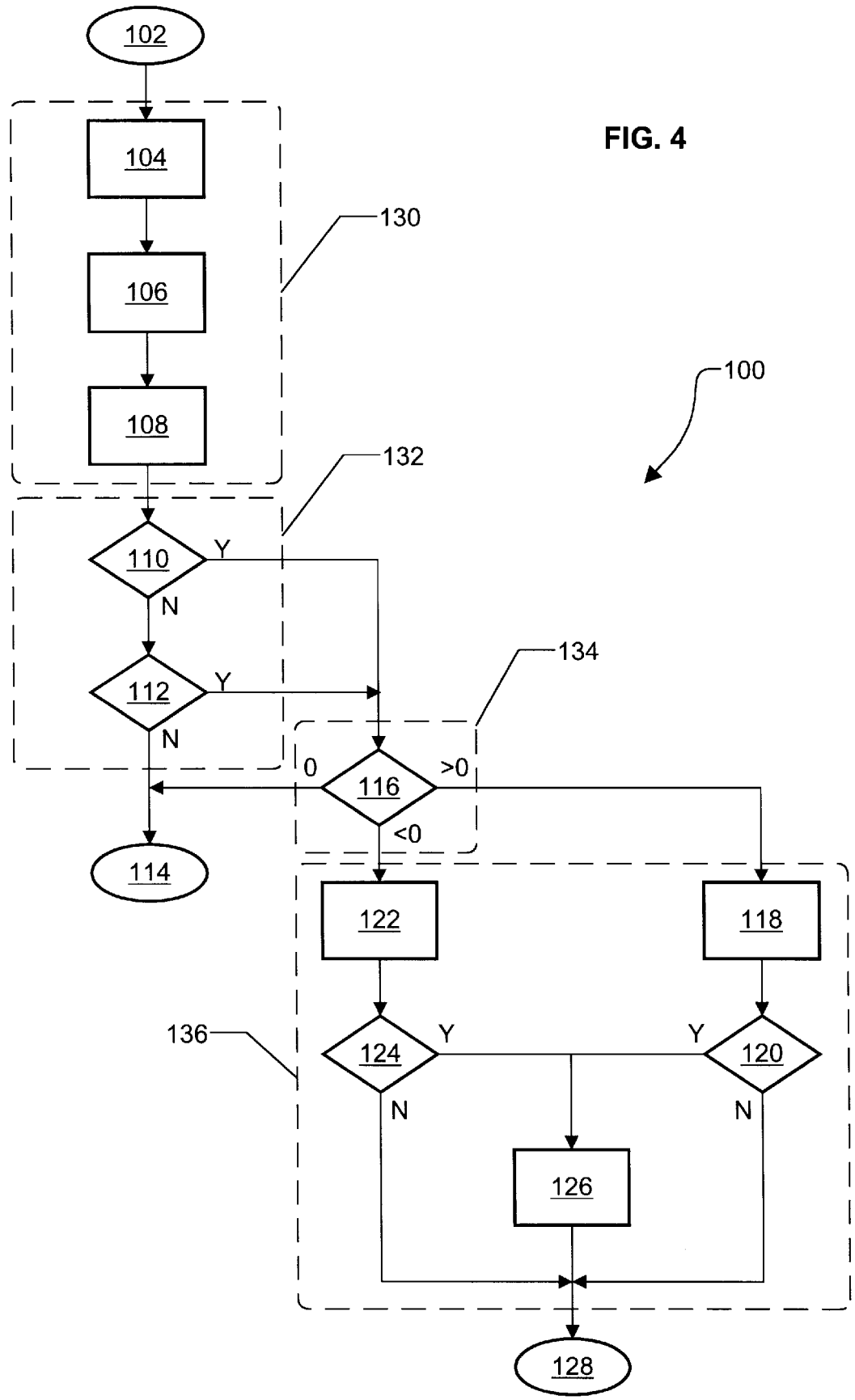
FIG. 4 is a flow chart of an optional automatic directing feature of the invention.

Therefore, an optional but highly desirable example feature which can be accomplished in the control-ware 18 is auto-leveling 100. FIG. 4 is a flowchart depicting one implementation of auto-leveling 100, and a stylized pseudo-code description of that implementation is listed here:

Step 102: Start.

Step 104: Compute the current and average mover 14 position and velocity.

Step 106: Compute the current and average orienter 16 position and velocity.

Step 108: Compute the current view pitch as the sum of the previous view pitch and the average orienter 16 position.

Step 110: If result of step 104 is "fast" (an arbitrary parameter), then go to step 116.

Step 112: If mover 14 is out of any dead-zone (an optional feature), then go to step 116.

Step 114: Return the result of step 106 (average orienter 16 velocity), done.

Step 116: Evaluate current view pitch,
if zero, then go to step 114 (return average orienter 16 velocity, done);
if above zero, then:
  Step 118: Decrement current view pitch by 10 degrees.
  Step 120: If current view pitch now less than zero,
then go to step 126 (set current view pitch to zero);
go to step 128 (return current view pitch, done);
if below zero, then:
  Step 122: Increment current view pitch by 10 degrees;
  Step 124: If current view pitch now greater than zero,
then go to step 126 (set current view pitch to zero);
go to step 128 (return current view pitch, done);
  Step 126: Set current view pitch to zero;
  Step 128: Return current view pitch, done;

In addition to the steps noted above, four general functions within the auto-leveling 100 process are also called out in FIG. 4: master step 130, gathering and initially processing data; master step 132, deciding if level control is even appropriate; master step 134, deciding if level control is actually needed; and, master step 136, applying leveling correction.

It should particularly be noted that auto-leveling 100 is not a strictly enforced process, it is user counteractable and it may also be selectively disabled under higher level software control (e.g., by the simulation, during particular activities). If it is determined in master step 132 that leveling control is appropriate (e.g., because movement is fast, see step 110, or because movement is ongoing, see step 112) and if the user is not effectively looking level already (see step 116), then it is assumed that we want to urge the view, up or down as needed, towards level in 10 degree increments. This urging is counteractable by the user continuing to input requests for more view pitch away from level. In effect, if a user wants to run around at high prolonged speed looking at the ceiling within a simulation using auto-leveling 100, they can do so, by constantly inputting look upward requests (e.g., with an unbounded trackball-like device like the orienter 16).

Numerous algorithms may be used to implement auto-leveling 100. For example, more complex algorithms using non linear view pitch angle adjustment rates will work, and other values for the amount of linear change besides 10 degree increments can be used. However, the inventor has found that this simple algorithm and this value for linear adjustment work well at a rate of adjustment of 30 times per second. Of course, other adjustment rates may also be used (30 times per second being merely a convenient data transmission rate to accomplish smooth video refresh). A refinement of this simple auto-leveling 100 is to use a non linear (e.g., exponential) function for the relationship between movement and view pitch. This refinement provides users with a lot of fine resolution view pitch adjustment when moving slow, but much less when moving rapidly. This is conceptually similar to conventional mouse ballistics today.

Auto-leveling 100 is an example of relating changing view pitch to linear movement. However, when users positionally rotate within simulations they also usually want to view at level. It therefore follows that another beneficial pre-processing task is to relate leveling of view pitch to positional yaw. This can be accomplished by detecting "fast" change of positional yaw (e.g., at step 108) and invoking master steps 134 and 136. A refinement of this is to adjust the speed of view pitch in relationship to the rate of positional yaw change (i.e., really fast rotation results in really fast view leveling). Further, this relationship can also be made non linear, to provide users with fine resolution when looking ahead, but much less when turning rapidly.

As noted, auto-leveling 100 is but one of many possible pre-processing tasks which the control-ware 18 can perform. FIG. 4 is actually a representation of the more generic control concept of auto-directing. For example, automatic forward view pointing (i.e., urging view yaw to directly ahead) can equally well be accomplished. It merely requires replacing instances of "pitch" with "yaw" in the pseudo-code presented above. However, it has been the inventor's experience that users prefer to directly control view yaw.

Further, automatic control need not be over only view axes, it can be used for movement axes as well, and the inventor anticipates that simulation creators will readily exploit this capability as well, to extend the capabilities of their products (e.g., to add cruise control or auto pilot type capabilities for some parameters).

As a peripheral effect of using automatic control with multiple axis input devices, the inventor has noticed significant benefit in the reduction of cross-talk between the axes of input. This is of particular importance, because almost all current first person control systems have a large number of axes controlled by one hand. For example, a typical problem when inputting view direction requests with devices like trackballs has been that moving the device to accomplish change in one axis may inadvertently also produce change in the device's other input axis. A user trying to direct their view to the left might in fact get their view pointed left, but also end up looking downward at their feet. An auto-directing capability like auto-leveling 100 makes such cross-talk effects temporary, or eliminates them entirely. Using a velocity dependent dead-zone (e.g., such as exists in auto-leveling 100 at Step 112) minor amounts of cross talk can be eliminated entirely. For example, by temporarily ignoring motion starts, where spurious other axis motion usually occurs, and using only smooth after-start data from the input device.

Figure 5:
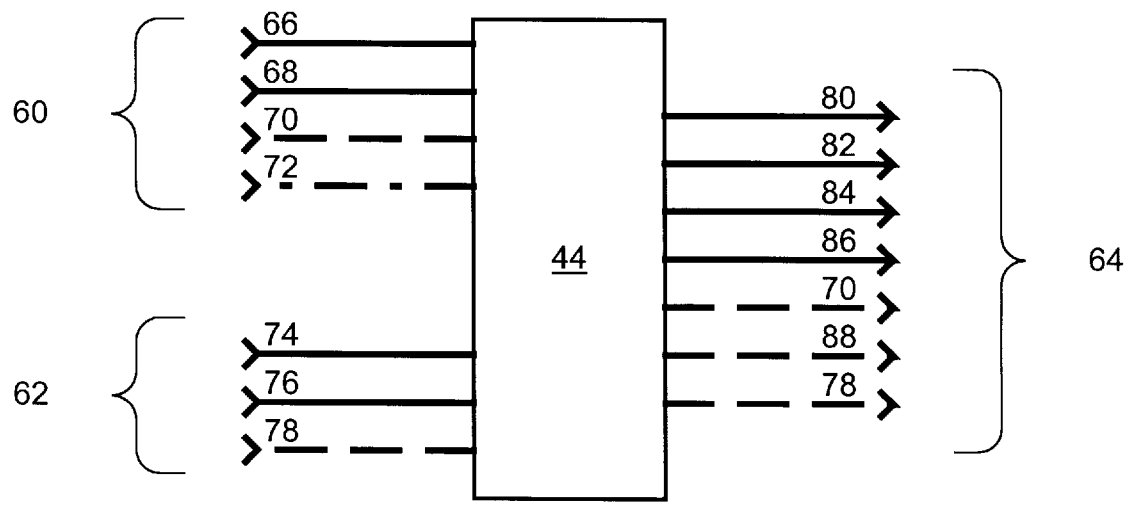
FIG. 5 is a diagram depicting is a diagram depicting in stylized form the signal flow into and out of the processor portion of the control-ware of an embodiment of the invention such as that in FIG. 2a–c.

FIG. 5 is a highly stylized depiction of signal flow into and out of the processor 44 of the control-ware 18 in a controller 10 such as that in FIG. 2a–c, in the context of a typical three-dimensional first person perspective gaming application. Data from the mover 14 enters the processor 44 as a mover data set 60 and data from the orienter 16 enters the processor 44 as an orienter data set 62. The processor 44 then integrates and performs pre-processing to form a unified data set 64, which is communicated ultimately to the simulation running on the PC 12.

The mover data set 60 includes an analog velocity signal 66 created by relative forward-reverse pivoting of the handle 24, an analog orientation yaw signal 68 (i.e., a rotate signal) created by relative left-right pivoting of the handle 24 in its other degree of freedom, an open door signal 70 (i.e., a manipulation) created by user activation of the trigger 36 type optional control 34, and a jump signal 72 (i.e., a pre-configured temporary Y-axis displacement) created by strong user pressure on the thumb pressure pad 38 type optional control 34 (note, although the pressure pad 38 is an analog input, it is here used to effect a digital type state change signal when a pressure threshold is crossed).

The orienter data set 62 includes a view pitch signal 74 created by relative toward-away from user rotation of the ball 32, a view yaw signal 76 created by relative left-right rotation of the ball 32, and an overdrive mode signal 78 created by user activation of the butt plate 40 type optional control 34.

The unified data set 64 includes a modified velocity signal 80, a modified orientation yaw signal 82, a modified view pitch signal 84, a modified view raw signal 86, a modified overdrive mode signal 88, the open door signal 70 (unmodified), and the overdrive mode signal 78 (also unmodified). One of the pre-processing tasks of the processor 44 is to apply a dead-zone (i.e., no signal as the joystick-like handle 24 is initially away from the "zero" position) to both the modified velocity signal 80 and the modified orientation yaw signal 82. Another pre-processing task is applying non-linear scaling and timestamping to the initially linear velocity signal 66 when it is converted into the modified velocity signal 80 (i.e., consistent with the non-linear operation of acceleration in motors and engines; further, the timestamping is used to permit calculation of smooth accelerations and decelerations at the PC 12, from the modified velocity signal 80). The view pitch signal 74 is pre-processed by imposing auto-leveling 100 on it when converting it to the modified view pitch signal 84. This has the beneficial additional effect of suppressing cross-talk between view pitch and yaw. Both the view pitch signal 74 and the view yaw signal 76 are further preprocessed by timestamping when creating the modified view pitch signal 84 and the modified view yaw signal 86, to facilitate later calculation of smooth time dependent vales at the PC 12. Since the open door signal 70 and the overdrive mode signal 78 (depicted as steady dashed lines for emphasis) are already in simple digital stage change format, they are passed directly into the unified data set 64. However, the jump signal 72 (depicted as a varying dashed line for emphasis) is pre-processed from analog into a digital state change by comparison to a pre-determined threshold level, thus becoming the modified overdrive mode signal 88 (which is also depicted as a steady dashed line). Finally, the unified data set 64 many be formatted (e.g., by a formatter (46, 48) into a serial, parallel, or other protocol) for communication to the PC 12. Alternately, if the processor 44 is implemented as a software driver running on the PC 12, the unified data set 64 can be delivered to a running simulation by conventional data passing mechanisms (e.g., DMA transfer, interrupt and memory pointer, or system buss I/O port handoff).

In addition to the above mentioned examples, various other modifications and alterations of the inventive system 10 may be made without departing from the invention. Accordingly, the above disclosure is not to be considered as limiting and the appended claims are to be interpreted as encompassing the entire spirit and scope of the invention.

INDUSTRIAL APPLICABILITY

The present controller 10 is well suited for application in controlling user first person interaction with graphical simulated environments. While, it is primarily anticipated that the controller 10 will be used with personal computers (e.g., PC 12), it may be used with other types of computer systems as well.

As computerized simulations, and particularly games, have grown increasingly sophisticated, allowing complex scenarios of movement, orientation, and view all within the simulation, computer input systems have been unable to meet user expectations. The present controller 10 addresses the current and growing need for a more sophisticated and capable user data input system. By effectively combining twice the inputting capability of presently available input devices, the controller 10 provides more control capability over simulations than can be achieved without two or more separate devices (e.g., a separate joystick and trackball). For example, the present controller 10, via its two control sub-units (14, 16), may be used to simultaneously input both movement commands and orientation commands. Alternately, the present controller 10 may be used to simultaneously input both movement commands and view directing commands. Further, the present controller 10 does this while still requiring only single input device communications hardware on the host computer system (e.g., requiring only one port, serial, parallel, infra-red or other).

The control-ware 18 of the present controller 10 permits presenting the user input commands to simulations running on the host PC 12 as unified command sets. Additionally, command sets may be presented in generic data formats (i.e., as standard units of linear or angular movement and view direction). In this manner the simulation is not burdened with having to additionally tailor the input commands for its needs, nor is the host PC 12 is burdened by having to run multiple drivers to accommodate multiple input devices, which would be necessary to otherwise accomplish the work of the controller 10.

The control-ware 18 further provides a convenient place to implement numerous desirable optional features of the controller 10. For example, as simulations become more sophisticated it is desirable to provide independent control of the users view within the simulation. The present controller 10 is quite capable of assuming this role as one of the tasks it is used for. Further, in the control-ware 18, automatic vision attributes can be implemented, such as automatic view pointing or auto-leveling 100 (which is described in detail above). Of course more common optional features, such as automatic movement leveling (common in fight games and simulations), may also be implemented in the control-ware 18.

For the above, and other, reasons, it is expected that the present inventive controller 10 will have widespread industrial applicability. No device presently available integrates four axis (i.e., four degrees of freedom) of flexibly allocable control, along with optional other controls, as does the controller 10. Further, no presently available user input system integrates necessary data acquisition and tailoring functions, along with optional data preprocessing functions, as does the controller 10. Therefore, it is expected that the commercial utility of the present invention will be extensive and long lasting.

I claim:

1. Controller data input apparatus, for a user to control in the first person perspective an environment of graphical images generated on a computer, comprising:

first manual input means, for the user to input two axes of acquisition data representing linear and orientation characteristics of the user's movement and view within the environment;

second manual input means, for the user to input two further axes of said acquisition data;

timestamping means, to timestamp said acquisition data so that the computer may later accurately calculate time related derivative functions of said acquisition data when generating the environment; and control means, for integrating said four axes of said acquisition data into a unified data set, and for communicating said unified data set to the computer for use therein to generate the environment of graphical images.

2. The apparatus of claim 1, wherein:

said first manual input means is a bounded input device; and said second manual input means is an unbounded input device.

3. The apparatus of claim 1, wherein:

said first and second manual input means are chosen from among the set consisting of joysticks, trackballs, and force sensitive electronic pads.

4. The apparatus of claim 1, wherein the computer has communications means, capable of receiving said acquisition data from said first and second manual input means, wherein:

said control means includes a driver program, running on the computer; and said driver program directs the computer in obtaining said acquisition data from said communications means of the computer, suitably processes said acquisition data into said unified data set, and stores said unified data set in the computer, for the computer to use in generating the environment.

5. The apparatus of claim 1, further comprising:

a processor unit, included in said control means, which directs obtaining the acquisition data from said first and second manual input means, suitably processes said acquisition data into said unified data set, and communicates said unified data set to the computer.

6. The apparatus of claim 1, further comprising:

a clock for use by said timestamping means; wherein said clock is dedicated to only synchronous tasks, to insure that latency between creation and timestamping of instances of said acquisition data is consistent, and thereby more accurate for use in calculating said time related derivative functions.

7. The apparatus of claim 1, further including:

a pre-processor, included in said control means, to selectively incorporate, modify, and tailor said acquisition data when creating said unified data set.

8. The apparatus of claim 7, wherein:

said pre-processor provides a dead-zone for at least one of said first and second manual input means, by selectively not incorporating portions of said acquisition data.

9. The apparatus of claim 7, wherein:

said pre-processor applies non-linear scaling to at least one of said axes of said acquisition data, to permit the user to non-linearly control the environment.

10. The apparatus of claim 7, further including:

override means, under control of the user, to permit the user to selectively disable said pre-processor.

11. The apparatus of claim 7, further including:

override means, controlled as a function of the rate of change with which the user inputs a said axis of said acquisition data, to permit disabling of said override means for a ranges of a said axis of said acquisition data.

12. The apparatus of claim 7, further including:

override means, under control of the computer, to permit an application running on the computer to selectively disable said pre-processor.

13. The apparatus of claim 7, wherein:

said pre-processor urges a user's direction of view within the environment toward level at a rate which is a function of the user's requested velocity within the environment.

14. The apparatus of claim 7, wherein:

said pre-processor urges a user's direction of view toward level at a rate which is a function of the user's requested rate of yaw within the environment.

15. A method of navigating through environment of graphical images in a computer which permits a user a first person perspective, comprising:

inputting two axes of acquisition data representing linear and orientational characteristics of the user's movement and view within the environment, with a first manual input device;

inputting two further axes of said acquisition data, with a second manual input device;

integrating said four axes of said acquisitions data into a unified data set;

timestamping said acquisition data, so that the computer may later accurately calculate time related derivative functions of said acquisition data when navigating within the environment; and communicating said unified data set to the computer, for use in navigating within the environment of graphical images.

16. The method of claim 15, wherein the computer has communications means, capable of receiving said acquisition data, the method further comprising;

executing a driver program on the computer; wherein said driver program directs the computer to obtain said acquisition data;

said driver program directs suitable processing of said acquisition data into said unified data set; and said driver program stores said unified data set in the computer, for the computer to use in navigating within the environment.

17. The method of claim 15, further comprising:

operating a processor unit; wherein said processor unit receives said acquisition data from said first and second manual input devices;

said processor unit processes said acquisition data into said unified data set; and said processor unit communicates said unified data set to the computer.

18. The method of claim 15, wherein:

said timestamping is performed using a clock dedicated to only synchronous tasks, to insure that latency between creation and said timestamping of instances of said acquisition data is consistent, and thereby more accurate for use in calculating said time related derivative functions.

19. The method of claim 15, further comprising:

pre-processing said acquisition data by selectively incorporating, modifying, and tailoring said acquisition data when integrating it into said unified data set.

20. The method of claim 19, wherein:

each said axis of said acquisition data has defined a set of instances falling within a range of possible values; and said pre-processing includes suppressing integration of part of said range into said unified data set, to provide a dead-zone.

21. The method of claim 19, wherein:

said pre-processing includes applying non-linear scaling to at least one of said axes of said acquisition data, to permit the user to non-linearly control the environment.

22. The method of claim 19, further including:

overriding said pre-processing selectively, under control of the user, to permit the user to selectively disable said pre-processing.

23. The method of claim 19, further including:

overriding said pre-processing selectively, as a function of the rate of change by which the user inputs a said axis of said acquisition data, to permit suppression of said overriding for a range of a said axis of said acquisition data.

24. The method of claim 19, further including:

overriding said pre-processing selectively, under control of the computer, to permit an application running on the computer to selectively disable said pre-processing.

25. The method of claim 19, wherein:

said pre-processing urges a user's direction of view within the environment toward level at a rate which is a function of the user's requested velocity within the environment.

26. The method of claim 19, wherein:

said pre-processing urging a user's direction of view within the environment toward level at a rate which is a function of the user's requested rate of yaw within the environment.

* * * * *